Jan. 22, 1952     R. P. RICHARDSON     2,583,063
VOLTAIC BATTERY
Filed July 9, 1945

INVENTOR
Richard Percy Richardson.
BY *O. E. O'dell*
ATTORNEY

Patented Jan. 22, 1952

2,583,063

UNITED STATES PATENT OFFICE 2,583,063

VOLTAIC BATTERY

Richard Percy Richardson, Erith, England

Application July 9, 1945, Serial No. 603,759
In Great Britain June 9, 1944

Section 1, Public Law 690, August 8, 1946
Patent expires June 9, 1964

3 Claims. (Cl. 136—111)

This invention relates to electric dry batteries of the layer type, that is to say batteries which are built up of a number of flat cells assembled in a pile. Various means are known of enclosing the several cells to prevent a bridge of electrolyte forming from one to another; they may be wrapped in insulating sheeting; or built in insulating containers or wrapped in elastic insulating wrappings which in part overlap their upper surface, or built in insulating containers which nest one within the other, in any of which constructions there must be an opening in the wrapping or container through which contact is established from cell to cell; or the cells may be built in metal containers forming the negative electrodes, which also may nest one within the other.

In making a battery the assembled pile of cells is usually compressed between the anvils of a press, and while so compressed is bound with paper tape passed lengthwise around the pile across the bottom of the lowest cell and the face of the top one. There must be gaps in the press anvils for the tape to be threaded through; the threading of it is tedious; the tape makes difficult the thorough carrying out of the subsequent steps of waxing and sealing; it adds to the space occupied by the battery; and it may break, for it is inelastic, not of reliably uniform strength, and apt to deteriorate if it becomes damp.

The present invention substitutes thread for tape as a means of binding the compressed pile of cells, and modifies the battery for the purpose of the thread binding so as to obviate threading through the anvils and permit the thread to be so disposed as hardly to increase the space occupied by the battery.

The invention is illustrated in the accompanying drawings in which

Figure 2:
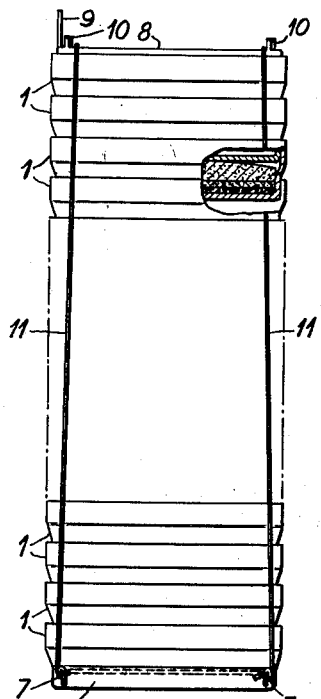
Figures 1 and 2 are elevations at right angles of a compressed and thread-bound battery, parts being broken away in the latter view to show the interior construction of a cell.
Figure 1:
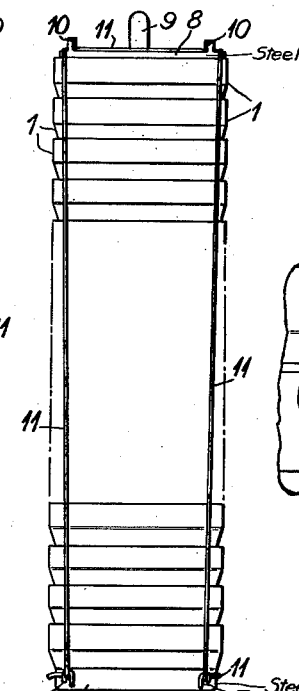
Figure 7:
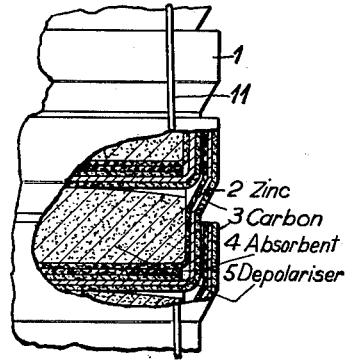
Figure 7 is an enlarged detail of a part of the battery, parts being broken away to show the interior construction.
Figure 4:
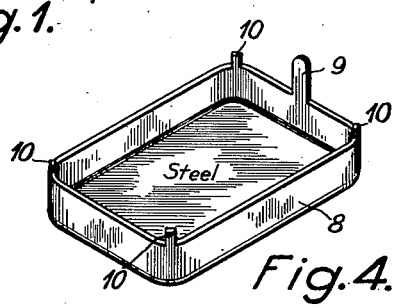
Figure 4 is a perspective view of an end fitting for the battery.

Figures 1 and 2 indicate a pile of any desired number of cells 1, say fifteen, the middle cells not being fully drawn. Figure 2 indicates that the cells are built in cell containers 2, which are of metal, usually zinc, and serve as the negative electrodes of the cells; this, however, is not essential to the invention. These containers are shown as rectangular with rounded corners as may be better seen from the similarly shaped end fitting seen in Figure 4; and also are shown as having a shoulder in their walls so that the external dimensions of the lower part of the container are as nearly as may be the same as the internal dimensions of its upper part; but these features of construction, though preferred, are also not essential. The construction has the advantage that the containers nest one within the other. As may be seen from Figure 7 the positive electrode may be formed of a coating 3 of carbon upon the bottom of the zinc container, preferably on its outer side. In each container is placed a bibulous layer 4 impregnated with electrolyte, and upon this a cake of depolarising mix 5.

Whatever the details of construction of the individual cells the pile of them needs to be held in compression firmly enough to ensure good electrical contact of the cell elements over their whole area. To this end, as already stated, it is usual to place the pile in a press, and while it is under pressure to bind it with tape. For the reasons already stated the battery of the present invention is bound with thread. Means are needed to hold the thread in place and to facilitate the binding operation.

Figure 3:
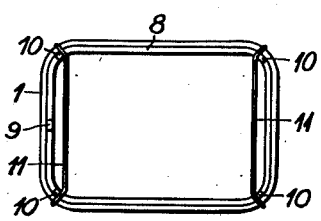
Figure 3 is a plan of this battery.

In the construction shown in Figures 1 to 3 the bottom cell container 6 is formed with small hooks 7 at its rounded corners. The container may with advantage be made of steel on account of its greater strength. The top cell 1 is closed by a steel dish 8 nesting in it, which may be of the form shown on a larger scale in Figure 4, that is to say it is a rectangular dish with rounded corners of the size and depth of the bottom part only of one of the cell containers 1. This dish may carry a tongue 9 for the soldering on of a terminal wire. It is also formed with minute projections 10 at the rounded corners of its edge, which serve to retain the thread in position. It may also have a coating of carbon so as to serve as a positive electrode for the top cell 1. Thus the bottom cell container 6 and the steel dish 8 form stiff end plates through which pressure is applied to the pile.

While the pile of cells is under pressure in the press a thread 11 is wound about it from top to bottom, passing beneath the hooks 7 and over the top edge of the dish 8 just within the projections 10. For example the thread may be hitched or wound about one of the hooks 7, and the hook pinched upon it to secure it; then carried to the top of the pile, across the top and down to a second hook 7 as seen in Figure 1, then along the long side of the bottom cell 6 beneath its shoulder, around the third hook 7, up to the top of the pile, across it, and down to the fourth hook 7 where it is made off and secured by closing the hook upon it.

It can be seen from the disposition of the thread that the anvils by which the pile is held compressed can be nearly of the full area of the cells, and yet not lie in the way of the winding. Also it is apparent from Figure 3 that the thread lying on the rounded corner of the pile, does not trespass beyond the rectangular space which the pile would in any case occupy.

After binding, the pile is encased to prevent any possibility of electrolyte leaking out between the nested cell containers. For this purpose it may be dipped in paraffin wax or like insulating composition which forms a sheathing over all the joints between the cells. It will be apparent that any such composition will readily penetrate between the thread and the cell junctions, so that the junctions are completely sealed. The waxed pile may be further encased in a sleeve of rubber, polyvinyl chloride or like elastic plastic.

Alternatively the pile may be waxed and sheathed and the thread binding applied outside the sheathing.

It is apparent that the binding thread must encircle end plates, or parts of end plates, stiff enough to distribute the pressure of the binding over the whole cross-sectional area of the battery; but these pressure-distributing end plates need not be electrical components of the cell, nor need they take the form of the components 6 and 8 above described.

Figure 5:
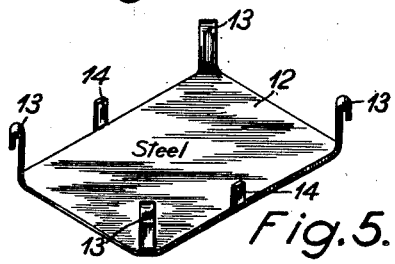
Figures 5 and 6 are perspective views of alternative constructions of end fitting.

In lieu of the steel cell container 6 a steel plate 12 such as is shown in Figure 5 may be employed; and such a plate is appropriate for use with batteries the cells of which are not enclosed in metal containers, but in containers or wrappings of insulating plastic. This is formed with hooks 13 at its corners, and with lugs 14 to assist in locating it beneath the bottom cell 1. A similar plate, inverted, may be used at the top of the pile in place of the dish 8. The bottom plate may have a perforation through which a lead may be soldered direct to the bottom cell container.

Figure 6:
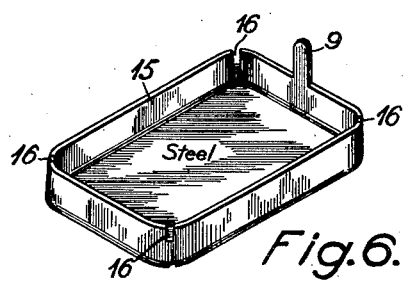

The half depth dish used at the top of the pile of Figures 1–3 may have the form shown in Figure 6, where instead of having projections such as 10, the corners of the edge of the dish 15 have minute notches 16 in them to receive the thread.

There are other ways of binding the pile with thread. For example, the thread could encircle only the thread retainers, being carried up and down along the same rounded edge of the pile, pressure being transmitted to the pile solely through the plates carrying the thread retainers.

It is preferable to employ a thread having slight elasticity; a linen or ramie thread is suitable.

What I claim is:

1. A dry battery comprising a pile of layer type cells, each cell including a negative electrode in the form of a metal container, the bottom container having hooks thereon, the cells of the pile being bound together by a binding of thread passing beneath said hooks and over the uppermost cell.

2. A dry battery comprising a pile of layer type cells, each cell including a negative electrode in the form of a metal container of internal dimensions at its mouth at least equal to the external dimensions of its lower part so that said electrodes nest one within the other, a metal dish nesting in and closing the uppermost container and formed with thread retainers, and a binding of thread around said pile of cells positioned by said thread retainers.

3. A dry battery comprising a pile of layer type cells, of rectangular form with rounded corners, rigid pressure-distributing plates at the ends of said pile, thread-engaging means upon said plates, and a binding of thread surrounding the pile lengthwise positively positioned by said thread-engaging means and holding the cells firmly together, the parts of said binding running lengthwise of the pile lying within the rectangular space that would be enclosed by prolongation of the straight sides of the cells.

RICHARD PERCY RICHARDSON.

REFERENCES CITED

The following references are of record in the file of this patent:

UNITED STATES PATENTS

| Number | Name | Date |
| --- | --- | --- |
| 1,340,222 | Graamans | May 18, 1920 |
| 1,415,804 | Crissey | May 9, 1922 |
| 1,916,709 | Zimmerman | July 4, 1933 |
| 2,193,781 | Smith | Mar. 12, 1940 |

FOREIGN PATENTS

| Number | Country | Date |
| --- | --- | --- |
| 482,363 | Great Britain | Mar. 24, 1938 |
| 569,552 | France | Jan. 8, 1924 |